(12) United States Patent
Suchanek

(10) Patent No.: US 9,095,794 B2
(45) Date of Patent: Aug. 4, 2015

(54) ZERO-BACKWASH LIQUID FILTER

(76) Inventor: Steven C. Suchanek, Madison, WI (US)

( * ) Notice: Subject to any disclaimer, the term of this patent is extended or adjusted under 35 U.S.C. 154(b) by 0 days.

(21) Appl. No.: 13/985,899

(22) PCT Filed: Feb. 22, 2012

(86) PCT No.: PCT/US2012/026069
§ 371 (c)(1),
(2), (4) Date: Jan. 24, 2014

(87) PCT Pub. No.: WO2012/116039
PCT Pub. Date: Aug. 30, 2012

(65) Prior Publication Data
US 2014/0131294 A1    May 15, 2014

Related U.S. Application Data

(60) Provisional application No. 61/463,693, filed on Feb. 22, 2011.

(51) Int. Cl.
*B01D 29/00* (2006.01)
*B01D 24/16* (2006.01)

(52) U.S. Cl.
CPC .......... *B01D 29/0075* (2013.01); *B01D 24/165* (2013.01); *B01D 29/0002* (2013.01)

(58) Field of Classification Search
CPC ........................................................ C02F 1/28
USPC .................................................. 210/792, 797
See application file for complete search history.

(56) References Cited

U.S. PATENT DOCUMENTS

| | | | |
|---|---|---|---|
| 3,713,538 A | | 1/1973 | Kass |
| 3,957,636 A | * | 5/1976 | Arvanitakis ................... 210/739 |
| 4,309,292 A | * | 1/1982 | Stannard et al. ............... 210/792 |
| 5,543,037 A | | 8/1996 | Hering, Jr. |
| 5,750,041 A | | 5/1998 | Hirane |
| 7,270,755 B2 | * | 9/2007 | Schwartzkopf ............... 210/741 |
| 2002/0023869 A1 | | 2/2002 | Remizov |
| 2004/0206710 A1 | | 10/2004 | Yamada et al. |
| 2007/0289917 A1 | | 12/2007 | Mylin et al. |
| 2009/0236289 A1 | | 9/2009 | Williams et al. |
| 2010/0243572 A1 | * | 9/2010 | Stouffer et al. ............... 210/679 |

FOREIGN PATENT DOCUMENTS

EP     0423403     4/1991

OTHER PUBLICATIONS

International Search Report and Written Opinion issued in PCT/US2012/026069, Sep. 26, 2012.

* cited by examiner

*Primary Examiner* — Tony G Soohoo
*Assistant Examiner* — Peter Keyworth
(74) *Attorney, Agent, or Firm* — Bell & Manning, LLC

(57) ABSTRACT

Methods and apparatus for filtering particulate matter from a liquid are provided. The apparatus comprise: a housing defining an internal volume; a liquid inlet port; a liquid outlet port disposed above the liquid inlet port; a filter medium support membrane housed within the housing and disposed between the liquid inlet port and the liquid outlet port; and a particulate filter medium loaded onto the filter medium support membrane. The apparatus are designed such that a flow of liquid introduced into the internal volume of the housing through the liquid inlet port and exiting the internal volume of the housing through the liquid outlet port will pass upward through the filter medium support membrane.

13 Claims, 9 Drawing Sheets

ZERO-BACKWASH LIQUID FILTER

CROSS-REFERENCE TO RELATED APPLICATIONS

This application is a National Stage of international Application No. PCT/US2012/026069, filed Feb. 22, 2012, which claims the benefit of U.S. Patent Application No. 61/463,693, filed Feb. 22, 2011, the contents of which are herein incorporated by reference.

BACKGROUND

Conventional sand water filter apparatus use a backwash step to periodically clean their filters. This backwash step can require a backwash rate of (10) gallons of water per square foot of surface area for removing the filtered waste. For example a common one (1) square foot sand filter would require a 10 gallon per minute flow rate for 30 minutes, resulting in the use of 300 gallons of water. In addition, some filters require a down rinse step to pack the filter bed with a filter medium, resulting in the use of even more water.

SUMMARY

Methods and apparatus for filtering particulate matter from a liquid are provided.

One embodiment of the present methods provides a method of filtering a waste liquid comprising suspended waste particles using a filter apparatus comprising: a housing defining an internal volume; one or more liquid inlet ports defined by apertures in a wall of the housing; one or more liquid outlet ports defined by apertures in a wall of the housing, the one or more liquid outlet ports disposed above the one or more liquid inlet ports; a filter medium support membrane housed within the housing and disposed between at least one of the one or more liquid inlet ports and at least one of the one or more liquid outlet ports; and a particulate filter medium loaded onto the filter medium support membrane.

In this embodiment, the method comprises introducing the waste liquid into the internal volume of the housing through at least one of the one or more liquid inlet ports, wherein a liquid flow pattern is established that carries the waste liquid in an upward direction through the filter medium loaded onto the support membrane and out of the internal volume of the housing through at least one of the one or more liquid outlet ports. In this process, a first portion of the waste particles is carried with the waste liquid into the filter medium support membrane, where the particles are filtered out of the waste liquid by the filter medium. A second portion of the waste particles, having a higher average particle mass (and, generally, a larger average particle diameter) than the first portion of waste particles, falls to the bottom of the housing, under gravity, without being carried into the filter medium support membrane. This is advantageous because it prevents heavier, larger particles from entering and clogging the loaded filter membrane. Once the waste liquid has been filtered in this matter, the introduction of the waste liquid into the internal volume of the housing is discontinued and the waste liquid remaining in the housing is drained. The loaded filter medium support membrane is then rinsed with a suitable rinsing liquid, such as water, to release spent particulate filter medium. Next, a liquid suspension of unspent (i.e., clean) particulate filter medium is introduced into the internal volume of the housing through one of the one or more liquid inlet ports, wherein the liquid suspension flows upward through the support membrane. As the liquid suspension passes through the filter medium support membrane, the suspended particulate filter medium is loaded onto the filter medium support membrane, thereby recharging the filter membrane.

One embodiment of the present filtering apparatus provides: a housing defining an internal volume; one or more liquid inlet ports defined by apertures in a wall of the housing; one or more liquid outlet ports defined by apertures in a wall of the housing, the one or more liquid outlet ports disposed above the one or more liquid inlet ports; and a filter medium support membrane housed within the housing. The filter medium support membrane is disposed between at least one of the one or more liquid inlet ports and at least one of the one or more liquid outlet ports, such that a flow of liquid introduced into the internal volume of the housing through said at least one liquid inlet port and exiting the internal volume of the housing through said at least one liquid outlet port will pass upward through the filter medium support membrane. The apparatus further comprises a filter medium source comprising a liquid suspension of a particulate filter medium and a filter medium charging tube comprising an inlet aperture in fluid communication with the filter medium source and an outlet aperture disposed within the housing, below the filter medium support membrane. Together, the filter medium source and the filter medium charging tube are configured such that a flow of the liquid suspension of particulate filter medium from the filter medium source can be introduced into the internal volume of the housing through the output aperture of the filter medium charging tube. Prior to exiting the internal volume of the housing through at least one of the liquid outlet ports, the flow of suspended filter medium particles will pass upward through the filter medium support membrane, thereby loading the support membrane with the particulate filter medium. The apparatus may further include a drain port defined by an aperture in a wall of the housing, such as the housing floor, and configured to release liquid from the internal volume of the housing. (Note, as used herein, the term "wall" is a general term that can refer to a side wall, a bottom wall—such as a floor of the housing, or a top wall—such as a housing cover.) In addition, the apparatus may include an air vent in communication with the internal volume of the housing and configured to introduce air into the internal volume of the housing during a drain down cycle.

Some embodiments of the filter apparatus include a rinsing liquid source comprising a rinsing liquid suitable for rinsing particulate filter medium out of the filter medium support membrane and a shower wand housed within the housing and disposed below the filter medium support membrane. The shower wand, which comprises a tube defining an internal bore and having a plurality of spray ports disposed along its length, is in fluid communication with the rinsing liquid source through one of the one or more liquid inlet ports and is rotatable around its longitudinal axis, such that a rinsing liquid can be introduced into the shower wand and sprayed out of the plurality of spray ports. The resulting liquid spray can be directed at the filter medium support membrane and various internal surfaces of the filter apparatus housing in order to release filter medium particles from the support membrane and to rinse the filter medium particles out of the housing.

In some embodiments of the filter apparatus, the filter medium charging tube is itself composed of multiple tube components, including a movable inlet extension tube. The movable inlet extension tube is disposed within the housing and configured such that it can be moved from a first position, in which its internal bore is not aligned with a liquid inlet port, to a second position, in which its internal bore is aligned with a liquid inlet port, such that when the movable inlet extension tube is in the second position it is in fluid communication with the filter medium source through said liquid inlet port.

The use of a movable inlet extension tube is advantageous because it allows a single liquid inlet port to be used as the point of introduction for different liquids during different operational cycles. For example, in the embodiment described above, a liquid inlet port can be configured such that it is in fluid communication with a waste liquid source comprising a liquid containing waste particles to be filtered and also in fluid communication with a filter medium source containing a filter medium particles suspended in a liquid. During the filter cycle, when the inlet extension tube is in the first position, it is not aligned with the liquid input port and, therefore, a waste liquid from the waste liquid source can be passed directly into the internal volume of the housing through said inlet port without passing through the filter medium charging tube. However, during a filter medium charging cycle, when the inlet extension tube is in the second position, it is aligned with the liquid inlet port, such that a liquid suspension of particulate filter medium from the filter medium source can be passed into the filter medium charging tube (and, ultimately, into the internal volume of the housing) through that liquid inlet port.

In some embodiments, the filter medium charging tube comprises a U-shaped segment and further comprises a particle diffuser attached to its output aperture, whereby the diffuser is positioned and configured such that, as a particulate filter medium in a liquid suspension passes into the housing through the output aperture, the particulate filter medium will flow upward through the filter medium support membrane and provide a substantially uniform distribution of the particulate filter medium on the filter medium support membrane.

In embodiments of the filter apparatus that include both the shower wand and the movable inlet extension tube, the movable inlet extension tube can be attached to the shower wand, such that the movable inlet extension tube is moved from the first position to the second position by rotating the shower wand around its longitudinal axis.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Apparatus and methods for filtering waste particles from a liquid, such as water, are provided.

The filter apparatus have the ability to separate heavy solids from lighter weight solids in a fluid stream before the heavy solids are passed through a filter medium. As a result, the filter apparatus require no backwashing to clean the filter medium and, thus, can save a tremendous amount of water for each cleaning cycle. In addition, the present filter designs can satisfy the need for a water filter that requires a minimum of "down" time for cleaning.

The filter apparatus have an up flowing filter design, wherein a filter medium is disposed below a supporting membrane when the filter apparatus is operating in the service (filtering) position. When filtering a liquid, such as water, light weight particles in the liquid are carried upward and trapped by the filter medium when the liquid is passed upward, thought the filter medium, and eventually out through a service outlet. Heavy particles, such as sand, will settle to the bottom of the filter apparatus, rather than passing upward through the filter medium and, thus, do not clog the filter medium. As such the present filter apparatus is an improvement on conventional down flow-type sand filters in which sand or other heavy particles flow into and can clog a filter medium rapidly.

The filter apparatus can be operated on a very low water pressure rating or, conversely, can be operated on high pressure. For example, in some embodiments, the filter apparatus are operated at a pressure of around 5 p.s.i.g. or lower. While in other illustrative embodiments, the filter apparatus can be operated at pressures around a conventional line pressure of 125 p.s.i.g. or greater. However, the filter apparatus are also adaptable to other water pressure ranges.

The filter apparatus can use diatomaceous earth (from this point called "DE") as a filter medium in a manner that produces little or no waste and can be cleaned manually or automatically. However, other particulate filter media can be used provided they are capable of filtering waste particles from a given waste liquid stream. Some such filter media will have equivalent or substantially equivalent densities, size and filtering capacity as DE.

An illustrative embodiment of a filter apparatus, including illustrative embodiments of the various components of the apparatus, in various stages of operation, are shown in FIGS. 1-9.

Figure 1:
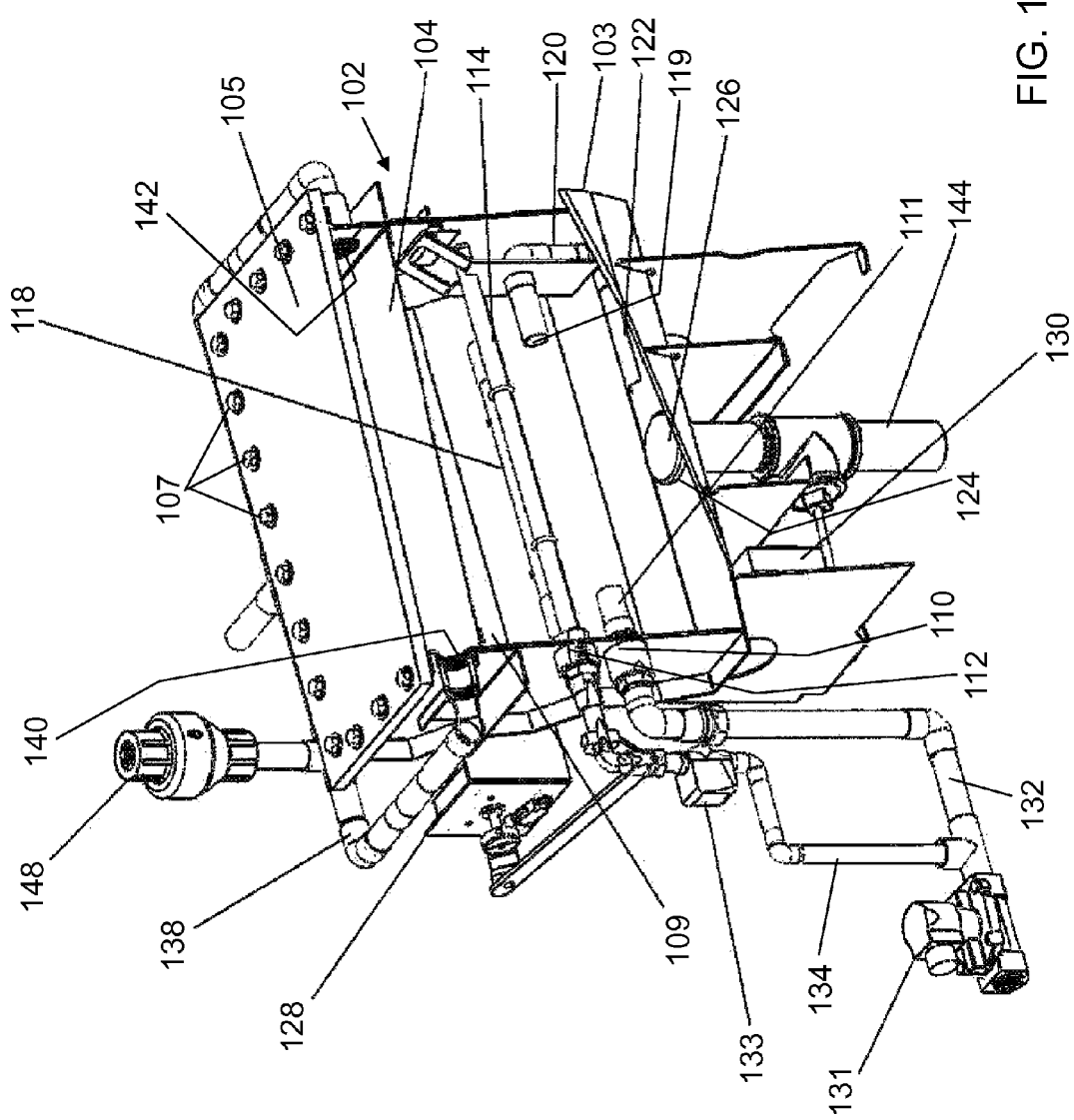
FIG. 1 is a schematic diagrams of a partially cut-away side view of a filter apparatus.
Figure 2:
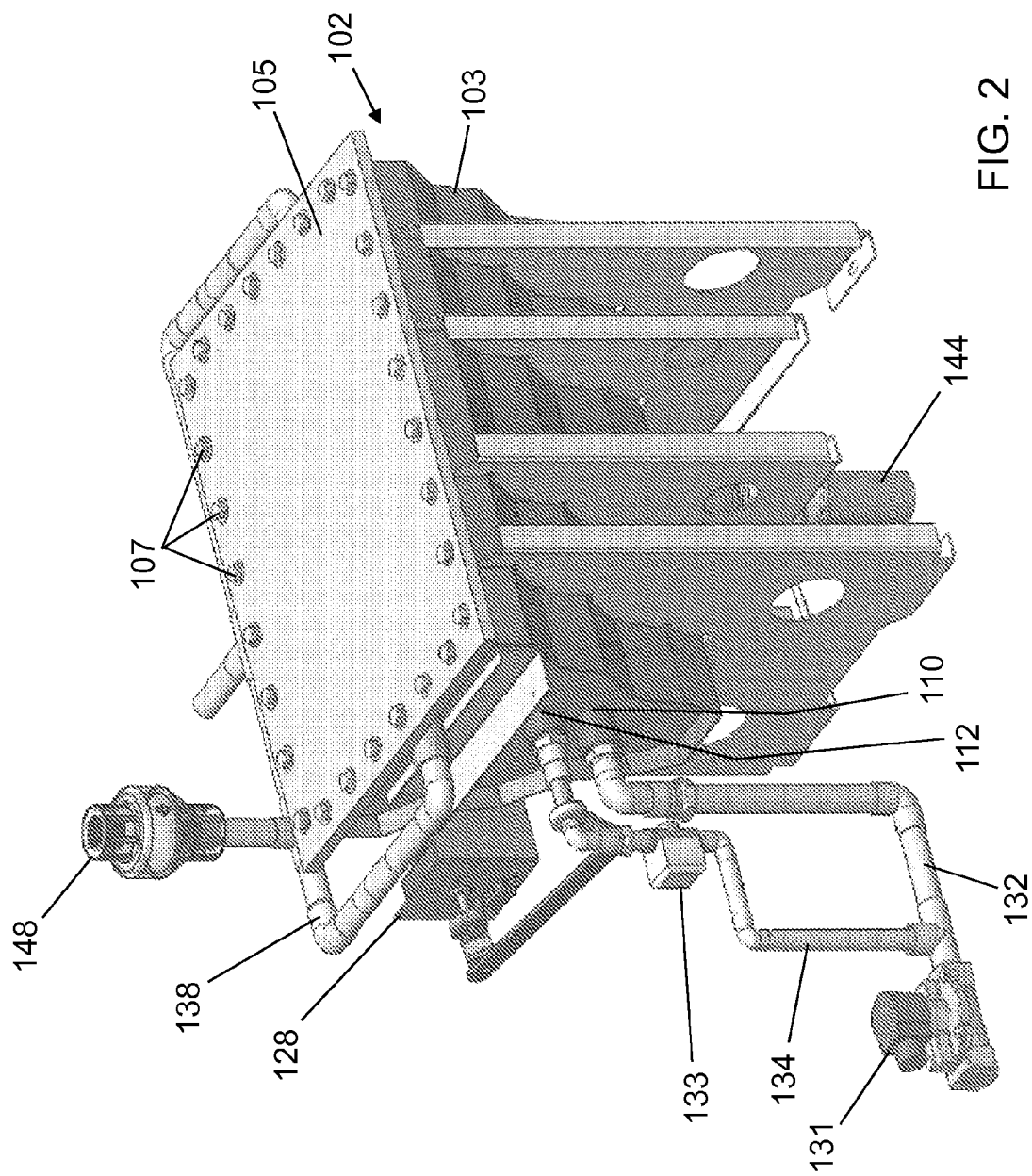
FIG. 2 is a schematic diagrams of a perspective side view of the filter apparatus of FIG. 1.

FIGS. 1 and 2 are schematic diagrams of a partially cut-away side view and a perspective side view of a filter apparatus, respectively. The filter apparatus includes a housing 102 that can be either of welded construction or injection molded. Housing 102 includes a body 103 and a cover 105 fastened together by a plurality of fasteners 107. Housing 102 houses a filter membrane shelf 109 that supports a filter medium support membrane 104 comprising a material into or onto which a filter medium can be loaded. One example of a suitable support membrane material is a plastic woven material. A filter medium, such as DE, 106 is loaded onto, and packed against, support membrane 104 during a charging cycle, as discussed in more detail below. The size of support membrane 104 can be of any scale to support the required flow rate. By way of illustration only, the approximate size of the support membrane depicted in this embodiment of the filter apparatus is 17 inches wide×20 inches long. Cover 105 has a continuous rib positioned around the periphery, which is configured to hold support membrane 104 against filter membrane shelf 109. Cover 105 also has downwardly extending internal ribs 108 (best shown in FIG. 3) that are positioned cross ways to hold support membrane 104 flat during the up flow filtering process. Rib apertures 113 of various shapes and sizes can be defined in the ribs in order to facilitate the flow of a liquid after it has passed through the filter medium.

The filter apparatus further comprises a main liquid inlet port 110 defined by an aperture in the wall of body 103 and configured to introduce a stream of liquid into the internal volume defined by housing 102. Inlet port 110 is in fluid communication with an inlet stub 111, which is an annular tube extending from inlet port 110 into body 103. The apparatus further comprises a shower wand inlet port 112 defined by an aperture in the wall of body 103 and configured to introduce a stream of liquid into a shower wand 114, which is housed within housing 102. Shower wand 114, which comprises an annular tube having a plurality of spray ports 116 along its length, is configured to oscillate back and forth around its longitudinal axis during a showering cycle. Rotatably attached to shower wand 114 is an extension inlet tube 118. Extension inlet tube 118 is configured such that—when the filter apparatus is in a filter medium charging cycle (see FIG. 6)—one end of its inner bore aligns with the inner bore of inlet stub 111 and the other end of its inner bore aligns with the inner bore at one end 119 of a "U-shaped" tube 120, wherein the one end 119 extends into body 103 and is disposed opposite inlet stub 111. "U-shaped" tube 120 also has a diffuser baffle 122 located at its other (lower) end 123, which is configured to distribute filter medium evenly during the filter medium charging cycle.

Located at the bottom of housing 102 is a drain port 124, defined by an aperture in the lower wall (i.e., floor) of body 103, which houses a drain plug 126. Driving the rotation of shower wand 114 is an electric motor 128. Opening and closing drain plug 126 is a solenoid 130.

External to housing 102 are various annular tubes (e.g., pipes or tubing) configured to deliver various fluids into the housing or to remove fluids from the housing. For example, a main inlet tube 132 in fluid communication with the internal volume of housing 102 through main liquid inlet port 110 can be used to deliver a liquid to be filtered (i.e., a waste liquid) into housing 102 when the filter apparatus is in service. Main inlet tube 132 can also be used to deliver a liquid suspension of particulate medium to the support membrane while the apparatus is in a filter medium charging cycle. Similarly, a shower wand inlet tube 134, which is in fluid communication with shower wand 114 through shower wand inlet port 112, can be used to deliver a rinsing liquid, such as water, to shower wand 114 when the apparatus is in a shower cycle. The flow of liquids through main inlet tube 132 and shower wand inlet tube 134 can be controlled by main inlet valve 131 and shower wand inlet valve 133. A main outlet tube 138, which is in fluid communication with the internal volume of housing 102 through one or more liquid outlet ports 140, 142 defined by apertures in the wall of body 103, can be used to allow a liquid to exit housing 102 after it has passed through filter medium 116. Finally, a drain tube 144 in fluid communication with the internal volume of housing 102 through drain port 124 can be used to allow liquids to drain out of through the bottom of the housing.

A pump (not shown) can be used to deliver fluids, such as water, to the filter apparatus through, for example, main inlet tube 132. The pump is desirably connected to a filter medium source which charges a particulate filter medium into a liquid being pumped through main inlet tube 132 in order to provide a liquid suspension of filter medium. This liquid suspension can be used to charge and recharge the filter medium, as discussed in more detail below. Alternatively, an automatic filter medium measuring unit can be use to inject the filter medium into the liquid at the correct time.

Control of the entire filter function can be accomplished using a programmable controller or a suitable mechanical timer. The filter medium cleaning cycle can be triggered by a pressure switch. In embodiments that include a pressure switch, the switch will trigger a cleaning cycle when the pressure in the filter apparatus increases because of a dirty filter medium bed. Alternatively, a mechanical timer may be used to schedule periodic cleaning cycles.

Figure 3:
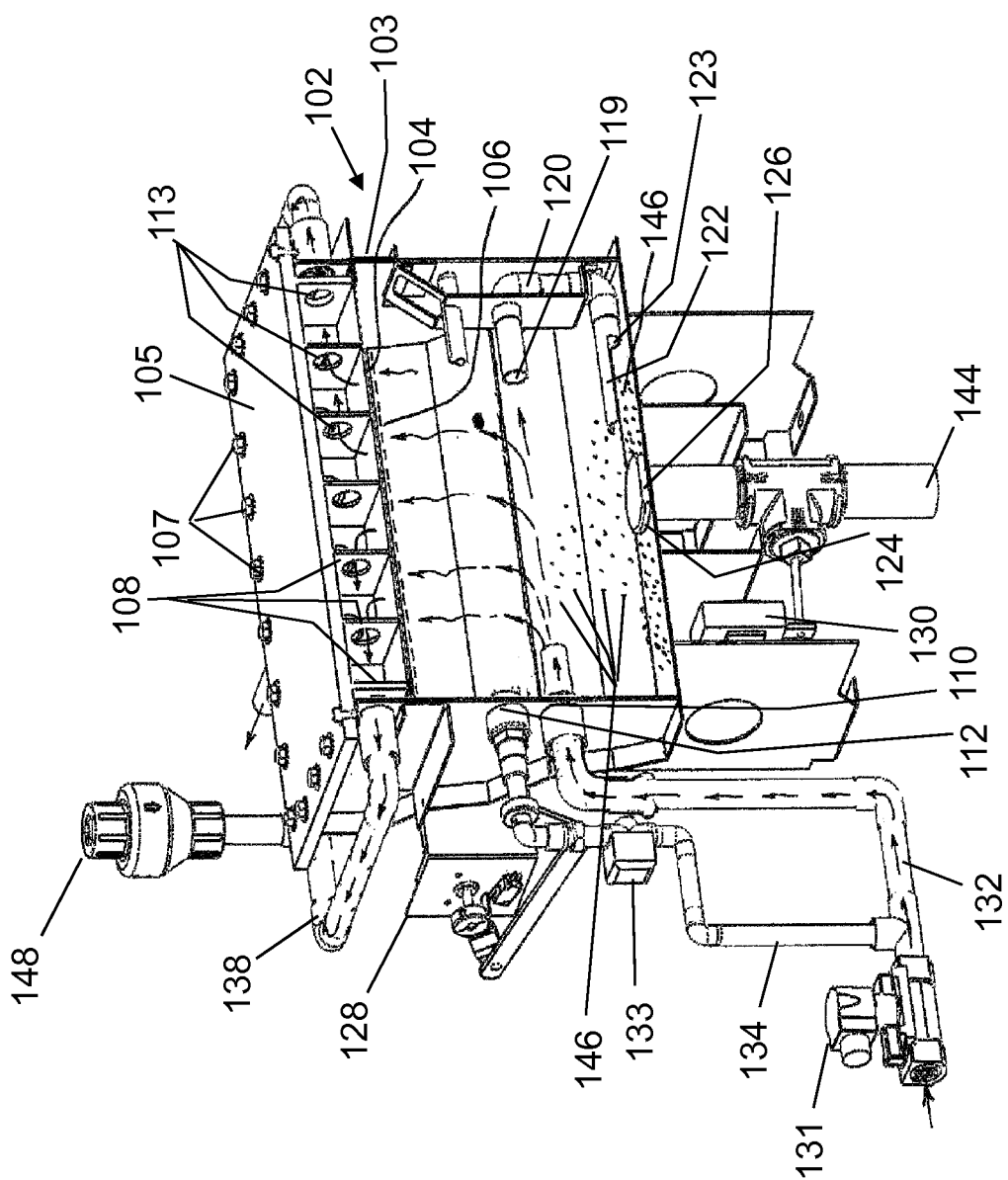
FIG. 3 shows a filter apparatus with the components positioned for a service (filtering) cycle.
Figure 4:
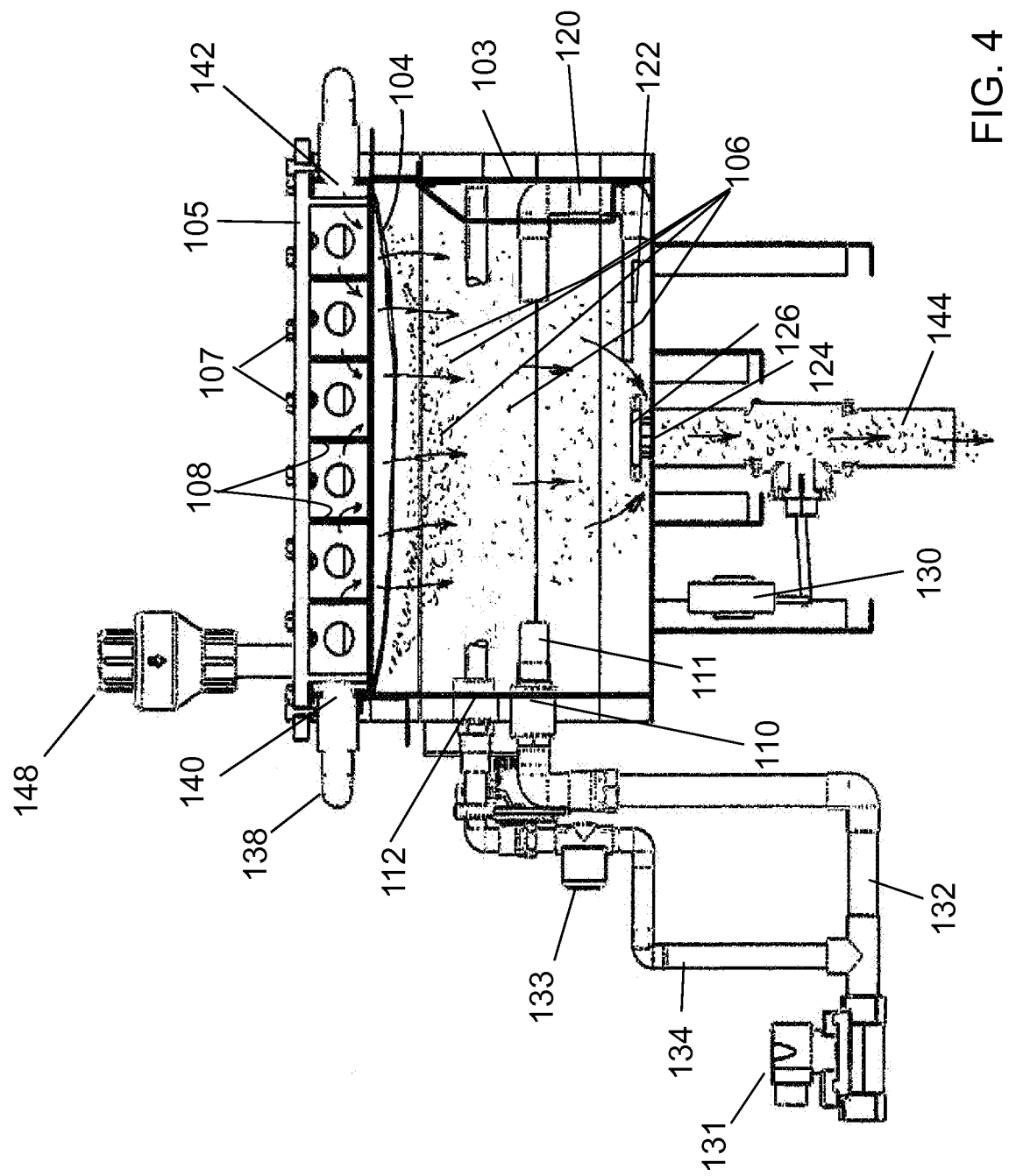
FIG. 4 depicts the filter apparatus with the components positioned for a drain down cycle.
Figure 5:
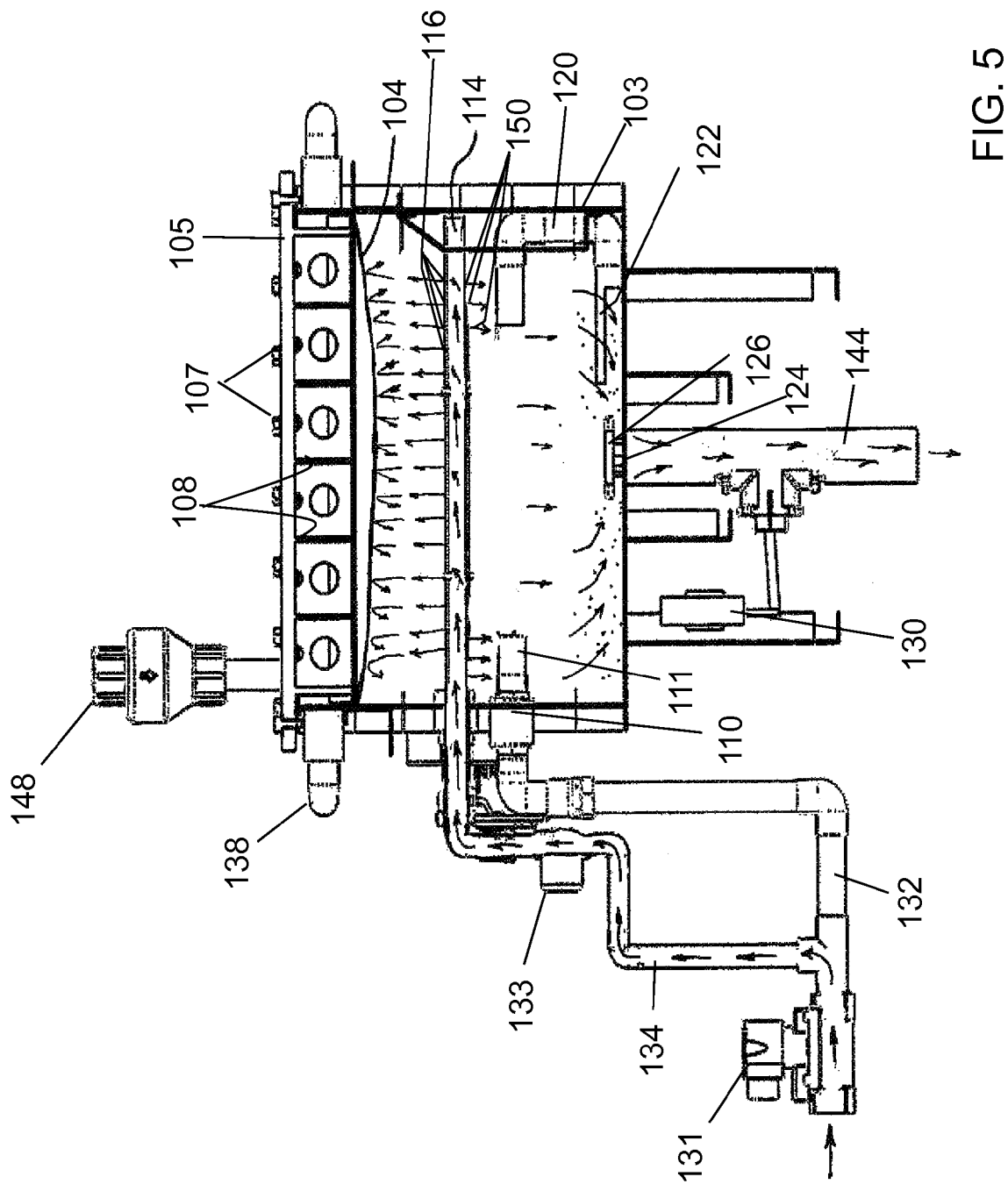
FIG. 5 depicts the filter apparatus with the components positioned for a shower cycle.
Figure 6:
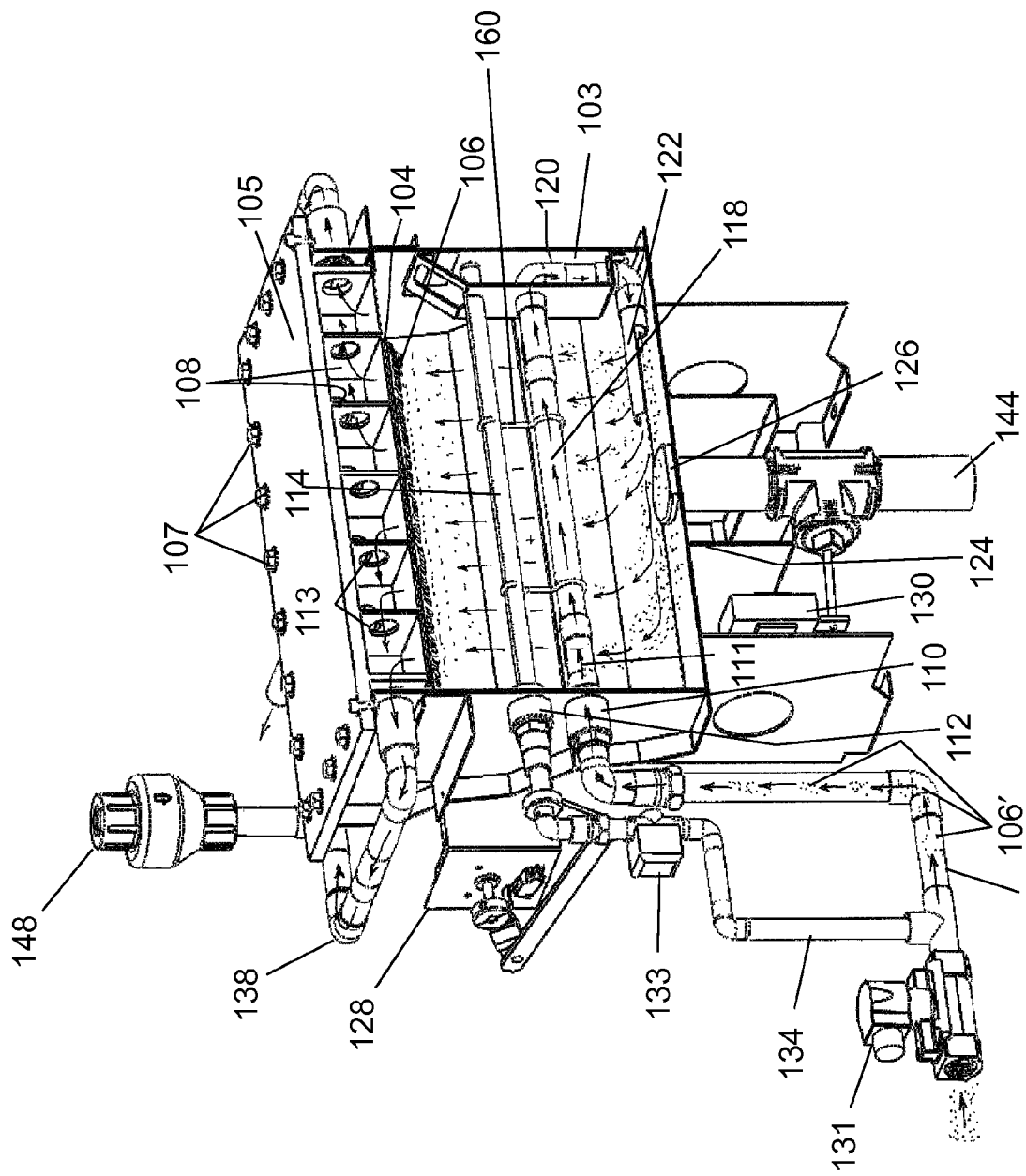
FIG. 6 depicts the filter apparatus with the components positioned for a filter medium charging cycle.
Figure 7:
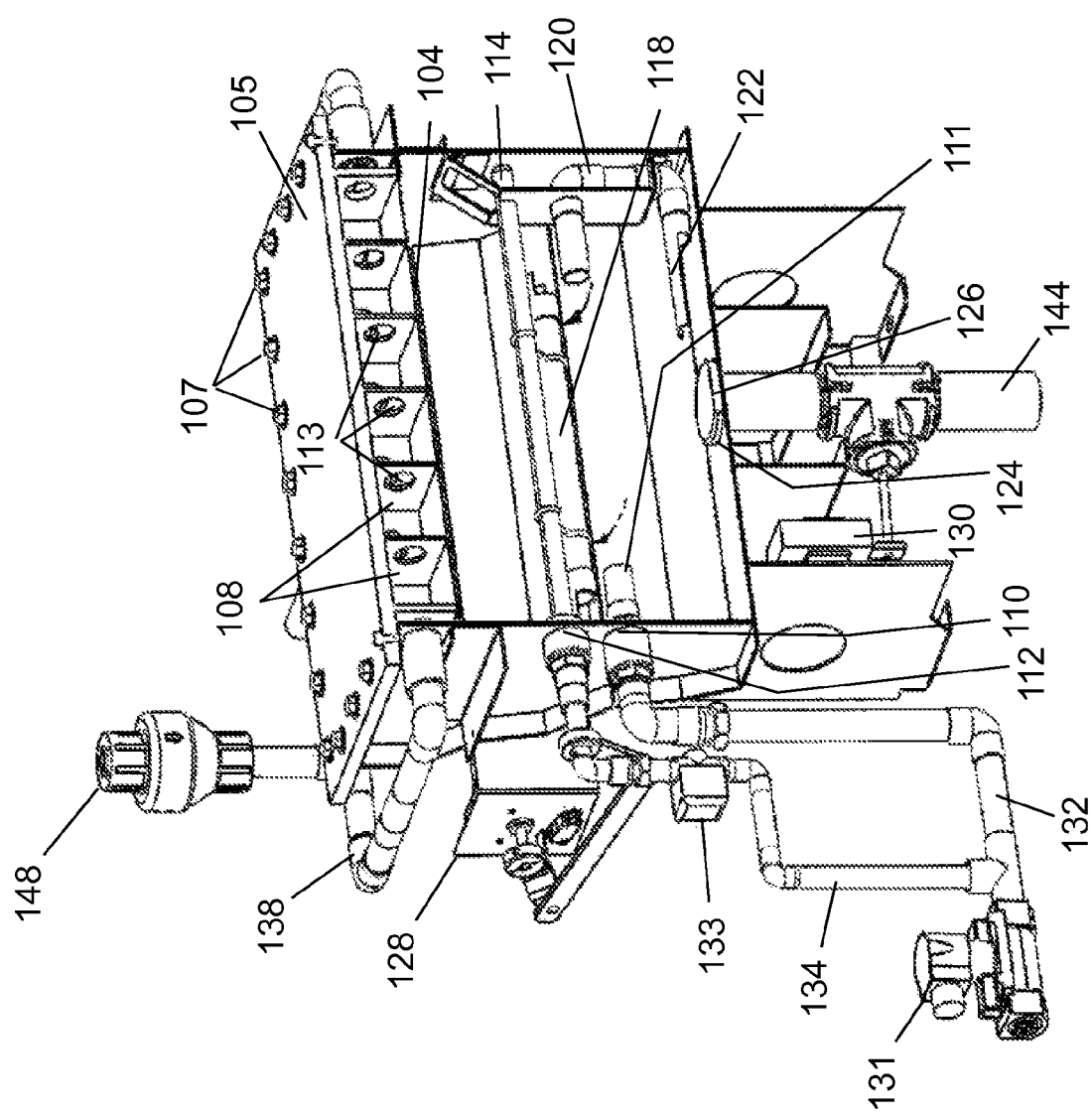
FIG. 7 depicts the filter apparatus after the components have been repositioned from the filter medium charging cycle back to the service cycle.
Figure 8:
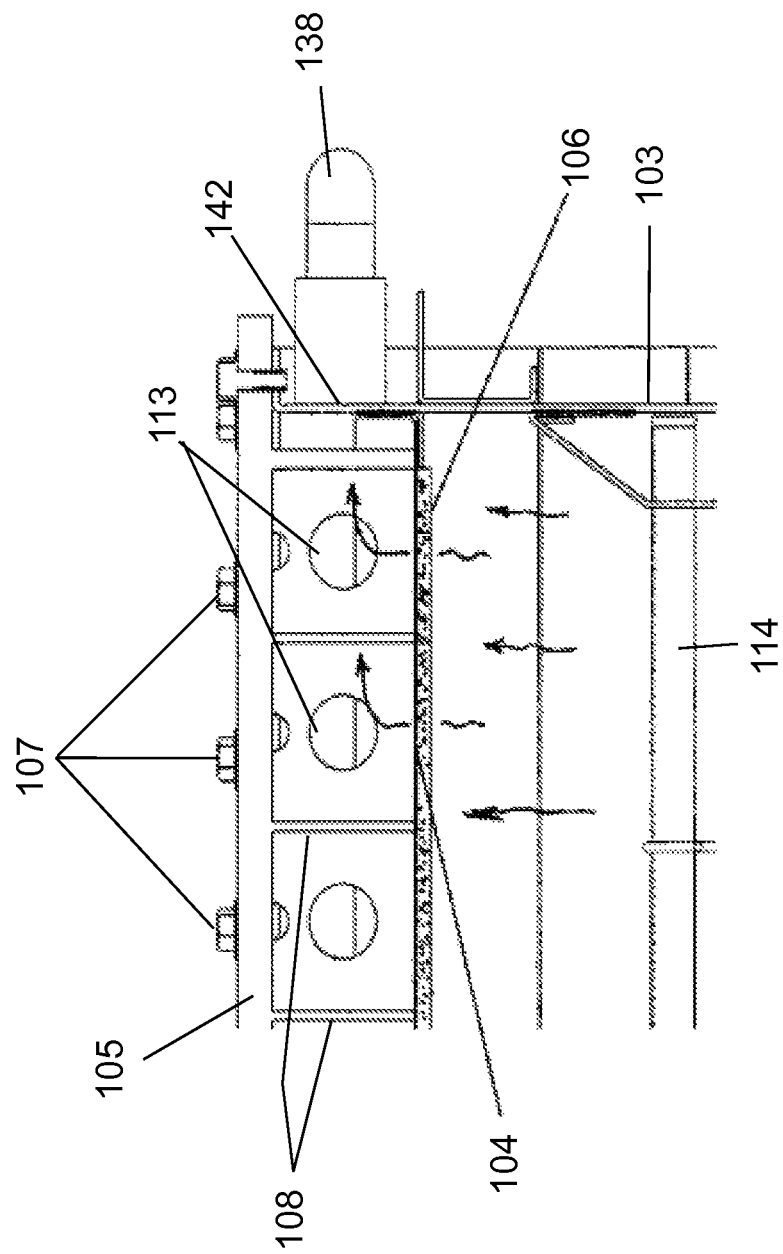
FIG. 8 depicts an enlarged view of the filter bed comprising the filter medium and the support membrane in the filter apparatus.
Figure 9:
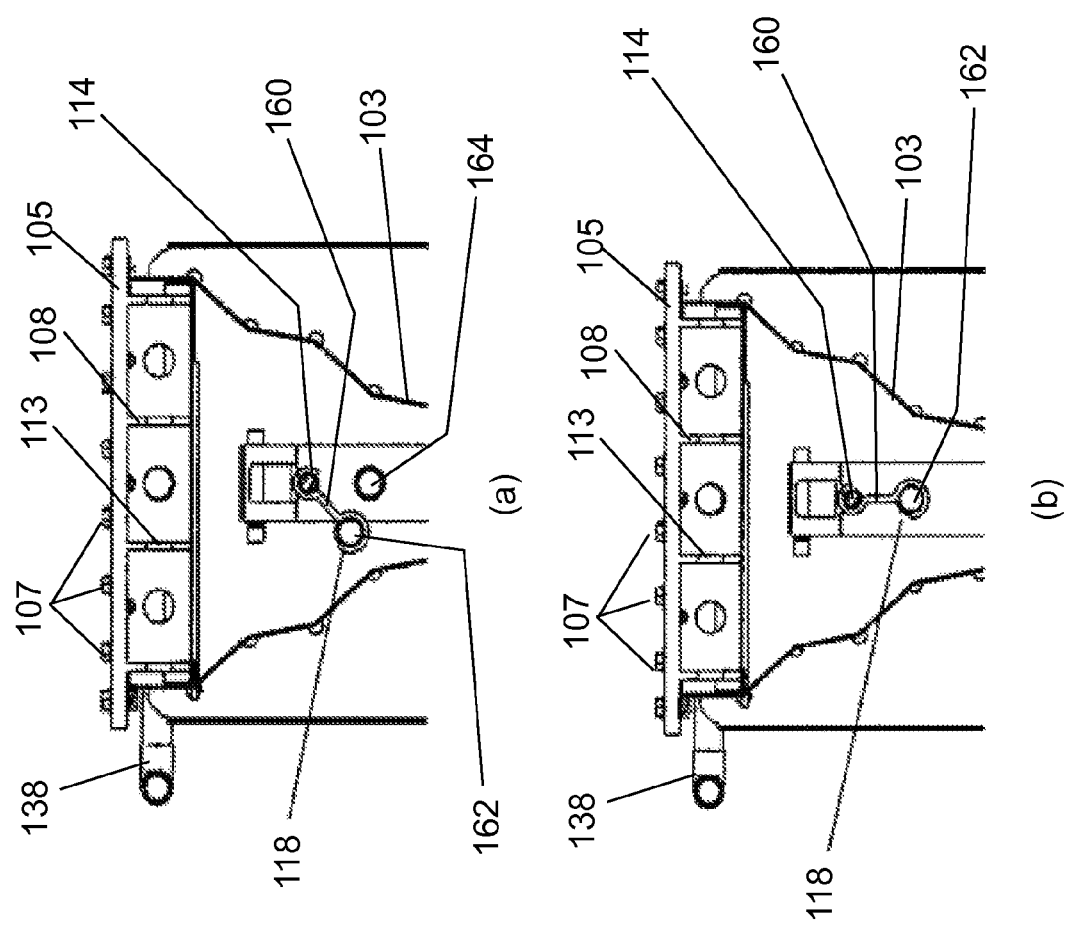
FIG. 9 depicts an enlarged view of a mechanism for rotating an inlet extension tube between its service position and its filter medium charging position.

FIGS. 1 and 2 are intended to illustrate the components of a filter apparatus without regard to a particular operational cycle. FIGS. 3-8 depict the filter apparatus in configuration for different operational cycles, each of which is described below. Briefly, FIG. 3 shows the filter apparatus with the components positioned for the service (filtering) cycle; FIG. 4 depicts the filter apparatus with the components positioned for the drain down cycle; FIG. 5 depicts the filter apparatus with the components positioned for the shower cycle; FIG. 6 depicts the filter apparatus with the components positioned for the filter medium charging cycle; FIG. 7 depicts the filter apparatus after the components have been repositioned from the filter medium charging cycle back to the service cycle. In addition, FIG. 8 depicts an enlarged view of the filter bed comprising the filter medium and the support membrane in the filter apparatus. Finally, FIG. 9 depicts an enlarged view of a mechanism for rotating inlet extension tube 118 between its service position and its filter medium charging position.

The Service Cycle:

FIG. 3 shows a partially cut-away side view of the filter apparatus configured to filter particulate matter from a liquid during the service cycle. During the service cycle (also referred to as the service mode), the filter bed, which comprises the filter medium and the support membrane, has been charged with the filter medium and is filtering a liquid. The flow of a liquid being filtered is represented by the arrows in the figure. As shown, a liquid comprising particulate matter to be filtered flows through main inlet pipe 132 into housing 102 through liquid inlet port 110 and inlet stub 111. The flow pattern established by the configuration of the apparatus and the fluid pressure within the apparatus creates an upward flow in the liquid (represented by the upwardly directed arrows in the figure), which carries the liquid through filter medium 106 and support membrane 104 and then out of housing 102 through main liquid outlet ports 140 and 142. The upward flow of liquid helps hold filter medium 106 onto support membrane 104. Before the flow of the liquid carries them to the filter bed, heavier particles 146 in the liquid fall downward to the floor of housing 102 and, therefore, do not enter and clog the filter bed. Lighter particles, which are generally smaller than the heavier particles, travel upward with the flow of the liquid and are trapped by filter medium 106. As a result, the subsequent cleaning cycle performance is maximized because the heavier particles fall and settle to the bottom and only the lighter debris rises with the liquid flow and is filtered from the liquid by the filter bed.

(In order to more clearly show the upflow of the liquid after it enters housing 102 the middle section of shower wand 114 and inlet extension tube 118 have been removed from FIG. 3, as well as from FIG. 4. However, these components are shown in position in FIG. 6, discussed below.)

The Drain Down Cycle:

When the surface of the filter medium becomes dirty, the cleaning phase can begin. FIG. 4 shows a side view of the of the filter apparatus releasing spent filter medium from the support membrane during the first part of the cleaning phase, the drain down cycle.

During the drain down cycle, the flow of liquid established during the service cycle is stopped. Drain port 124 at the bottom of housing 102 opens and the liquid remaining in housing 102 rapidly flows down drain tube 144 under the force of gravity. At the same time the particulate filter medium 106 released from support membrane 104 and containing lighter filtered waste particles flows out drain port 124 with the fluid. An air vent 148, which can be, for example, a check valve plumbed to the outlet, lets air in to replace the liquid and aids in rapid liquid removal. During this cycle, support membrane 104 sags when the upflow of the liquid is replaced by the downward flow of air. When this happens, the weaving of the fibers of support membrane 104 tend to roll away from each other and un "pinch" (release) any filter medium particles which may have become wedged in between the fibers during the filtering cycle. After the liquid and filter medium are removed from housing 102, the drain port remains open and the apparatus is ready for the next part of the cleaning phase, the shower cycle, to begin.

The Shower Cycle:

During the shower cycle, the remaining debris (e.g., heavy particulate waste and particulate filter medium) is rinsed out of housing 102. This is a rapid process, which can take place in ten to eighteen seconds, or less. FIG. 5 shows a side view of the of the filter apparatus configured to carry out the shower cycle.

During the shower cycle, shower inlet tube 134 is pressurized with a rinsing liquid, such as water, which flows into the internal bore of shower wand 114 through shower wand inlet port 112 and out through spray ports 116 (also referred to as holes) located along the length of the shower wand. During the shower cycle, shower wand 114 oscillates back and forth around the longitudinal axis running through its internal bore, thus spraying the underside of support membrane 104 to help remove remaining filter medium particles. The oscillating liquid spray also strikes portions of the internal side walls of housing 102. Additional spray ports 150 on the bottom side of spray wand 114 can be used to spray the bottom half of the internal side walls and the floor of housing 102. The floor of housing 102 is sprayed on each of the ends in order to flush the remaining debris to the center of the housing floor and down drain tube 144.

The Filter Medium Charging Cycle:

After the shower cycle is completed, a change in the internal plumbing of the filtering apparatus takes place, wherein inlet extension tube 118 is moved from a first, non-functioning position, in which its opposing ends are not connected to other tubes, to a second, operational position in which one of its ends is aligned with the end of inlet stub 111 and its other end is aligned with end 119 of U-shaped tube 120. In this operational position (shown in FIG. 6), inlet stub 111, inlet extension tube 118 and U-shaped tube 120 together form an inlet tube assembly (also referred to as a filter medium charging tube) configured such that a liquid introduced into housing 102 through inlet port 110 will flow through inlet stub 111, through inlet extension tube 118, into end 119 of U-shaped tube 120 and out through the other end 123 of U-shaped tube 120. This change in internal plumbing can take place rapidly. For example, in some embodiments, it takes place in about 5 seconds or less.

After inlet extension tube 118 is aligned with inlet stub 111 and U-shaped tube 120, housing 102 begins to fill from the bottom with liquid suitable for delivering a particulate filter medium to the support membrane (i.e., a charging liquid) through the inlet tube assembly. When the housing is nearly full, unspent particulate filter medium 106' is introduced into the liquid traveling through the inlet tube assembly, as indicated by the arrows in FIG. 6. Filter medium 106', suspended in the liquid, travels through inlet stub 111, through inlet extension tube 118 and into "U-shaped" tube 120. The liquid and suspended filter medium then pass out diffuser 122 and are distributed in all directions in an upward fashion, carried by the upflow of the liquid. The flow of liquid travels upward and passes through support membrane 104 at which time the particles of filter medium 106', which are too large to pass through the membrane, are collected evenly on the membrane while the charging liquid passes through the membrane and out through main liquid outlet ports 140 and 142. This cycle can be carried out rapidly. For example, in some embodiments, this cycle can be carried out in about one hundred and twenty seconds or less.

The filter apparatus is desirably plumbed so that a closed liquid flow loop is formed and the charging liquid (e.g., water) constantly recirculates from the main liquid outlet ports 140 and 142 back to main liquid inlet port 110 while the support membrane is being charged with the filter medium. The duration of the charging cycle is desirably long enough to create a layer of charging medium with a substantially uniform thickness sufficient to provide the quality of water desired for a given application (i.e., the more filter medium deposited, the cleaner the resulting filtered water). By way of illustration, approximately one sixteenth of an inch of DE will yield about five micron filtered water. If more DE is introduced, the average particle size in the effluent will we lower.

Transitioning Back to the Service Cycle:

After the unspent filter medium has been introduced and packed against the lower surface of support membrane 104, the inlet tube assembly can be disassembled within housing 102 in order to reconfigure the filter apparatus for its service cycle, as shown in FIG. 7. This can be done using shower wand drive motor 128. Motor 128 rotates shower wand 114, which has inlet extension tube 118 attached thereto, several degrees around its longitudinal axis, such that inlet extension tube 118 is rotated sideways in arc about said axis. Once this rotation is completed, a liquid to be filtered can flow unrestricted through main liquid inlet port 110 into the internal volume of housing 102, after it exits through the distal end of inlet stub 111. The remaining filter medium particles that haven't become packed against support membrane 104 and are still flowing around inside the liquid within the filter apparatus will become disturbed, caught in the liquid flow and then packed onto the filter bed. This reconfiguration into the service cycle position can be carried out rapidly. For example, in some embodiments the reconfiguration can be carried out in about fifteen seconds, or less FIGS. 8 and 9 provide cross-sectional side views of portions of the filter apparatus in order to better illustrate the filter bed and the inlet extension tube rotation mechanism of the filter apparatus shown in FIGS. 1-7.

FIG. 8 shows particles of filter medium 106 packed into support membrane 104. Liquid flow through the packed support membrane is represented by the wavy arrows in the figure. As shown, the liquid flows upward through packed support membrane 104 where a portion of particle waste in the liquid is filtered out by filter medium 106. The filtered liquid then flows through rib apertures 113 and out of housing 102 through outlet port 142.

FIG. 9(*a*) shows a side view of extension inlet tube 118 configured for the service cycle. In the embodiment depicted here, extension inlet tube 118 is attached to shower wand 114 by a series (e.g., two or more) hooks 160 such that the rotation of shower wand 114 around it internal longitudinal axis causes extension inlet tube 118 to rotate in an arc around that axis. In the configuration shown in FIG. 9(a), shower wand 114 is positioned such that the internal bore 162 of inlet extension tube 118 is displaced from (i.e., not aligned with) the internal bore 164 of end 119 of U-shaped tube 120 and from the internal bore of inlet stub 111 (not shown here).

FIG. 9(b) shows a side view of extension inlet tube 118 configured for the filter medium charging cycle. In this configuration, shower wand 114 is positioned such that the internal bore 162 of inlet extension tube 118 is aligned with the internal bore 164 of end 119 of U-shaped tube 120 and with the internal bore of inlet stub 111 to provide an assembled filter medium charging tube.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of filtering a waste liquid comprising a suspension of waste particles using a filter apparatus comprising:
   (a) a housing defining an internal volume;
   (b) one or more liquid inlet ports defined by apertures in a wall of the housing;
   (c) one or more liquid outlet ports defined by apertures in a wall of the housing, the one or more liquid outlet ports disposed above the one or more liquid inlet ports;
   (d) a filter medium support membrane housed within the housing and disposed between at least one of the one or more liquid inlet ports and at least one of the one or more liquid outlet ports;
   (e) a filter medium source comprising a liquid suspension of a particulate filter medium that traps and filters waste particles from the waste liquid;
   (f) a filter medium charging tube comprising an inlet aperture in fluid communication with the filter medium source and an outlet aperture disposed within the housing below the filter medium support membrane;
   (g) a drain port defined by an aperture in a wall of the housing and configured to release liquid from the internal volume of the housing; and
   (h) an air vent in communication with the internal volume of the housing and configured to introduce air into the internal volume of the housing, the method comprising:
   introducing a liquid suspension of particulate filter medium into the internal volume of the housing through one of the one or more liquid inlet ports, wherein the liquid suspension flows upward through the support membrane, such that the suspended particulate filter medium is loaded against the lower surface of the filter medium support membrane;
   introducing the waste liquid into the internal volume of the housing through at least one of the one or more liquid inlet ports, wherein a liquid flow pattern is established that carries the waste liquid in an upward direction through the loaded filter medium support membrane and out of the internal volume of the housing through at least one of the one or more liquid outlet ports; and further wherein a first portion of the waste particles is carried with the waste liquid into the loaded filter medium support membrane, where they are trapped by the particulate filter medium, which filters them out of the waste liquid and prevents them from flowing out of the one or more liquid outlet ports with the waste liquid, and a second portion of the waste particles, having a higher average particle mass than the first portion of waste particles, falls to the bottom of the housing, under gravity, without being carried into the loaded filter medium support;
   discontinuing the introduction of the waste liquid into the internal volume of the housing;
   opening the drain port;
   replacing the flow of the waste liquid in the upward direction with a downward flow of air against the filter medium support membrane; and
   draining the waste liquid remaining in the internal volume of the housing and the particulate filter medium containing the filtered waste particles through the drain port;
   wherein the method does not include the step of backwashing water through the particulate filter medium to clean filtered waste particles from the particulate filter medium.

2. The method of claim 1, wherein the filter apparatus further comprises:
   (i) a rinsing liquid source comprising a rinsing liquid suitable for rinsing particulate filter medium out of the filter medium support membrane; and
   (j) a shower wand housed within the housing below the filter medium support membrane, the shower wand comprising a tube having a plurality of spray ports disposed along its length, wherein the shower wand is in fluid communication with the rinsing liquid source through one of the one or more liquid inlet ports and is rotatable around its longitudinal axis, the method further comprising:
   introducing air into the internal volume of the housing through the air vent; and
   introducing a rinsing liquid into the shower wand, whereby the rinsing liquid sprays out the plurality of spray ports, and rotating the shower wand around it longitudinal axis such that the rinsing liquid sprays the lower surface of the filter medium support membrane to release particulate filter medium from the filter medium support membrane.

3. The method of claim 1, wherein the waste liquid passes through only a single loaded filter medium support membrane within the housing.

4. The method of claim 1, wherein the particulate filter medium is diatomaceous earth.

5. The method of claim 1, wherein the waste particle filtering capacity of the particulate filter medium is equivalent to, or substantially equivalent to, that of diatomaceous earth.

6. A method of filtering a waste liquid comprising a suspension of waste particles using a filter apparatus comprising:
   (a) a housing defining an internal volume;

(b) one or more liquid inlet ports defined by apertures in a wall of the housing;
(c) one or more liquid outlet ports defined by apertures in a wall of the housing, the one or more liquid outlet ports disposed above the one or more liquid inlet ports;
(d) a filter medium support membrane housed within the housing and disposed between at least one of the one or more liquid inlet ports and at least one of the one or more liquid outlet ports;
(e) a filter medium source comprising a liquid suspension of a particulate filter medium that traps and filters waste particles from the waste liquid;
(f) a filter medium charging tube comprising an inlet aperture in fluid communication with the filter medium source and an outlet aperture disposed within the housing below the filter medium support membrane, wherein the filter medium charging tube comprises a movable inlet extension tube disposed within the housing and configured such that it can be moved from a first position, in which its internal bore is not aligned with a liquid inlet port, to a second position, in which its internal bore is aligned with a liquid inlet port, such that when the movable inlet extension tube is in the second position it is fluid communication with the filter medium source through said liquid inlet port; and further wherein the liquid inlet port, with which the internal bore of the movable inlet extension tube is aligned when it is in the second position, is in fluid communication with a waste liquid source comprising a liquid having waste particles suspended therein, such that the waste liquid can be passed into the internal volume of the housing through said inlet port when the movable inlet extension tube is in the first position and the liquid suspension of particulate filter medium can be passed into the internal volume of the housing, through the inlet extension tube, when the inlet extension tube is in the second position;
(g) a drain port defined by an aperture in a wall of the housing and configured to release liquid from the internal volume of the housing; and
(h) an air vent in communication with the internal volume of the housing and configured to introduce air into the internal volume of the housing,
the method comprising:
introducing a liquid suspension of particulate filter medium into the internal volume of the housing through one of the one or more liquid inlet ports, wherein the liquid suspension flows upward through the support membrane, such that the suspended particulate filter medium is loaded against the lower surface of the filter medium support membrane;
introducing the waste liquid into the internal volume of the housing through at least one of the one or more liquid inlet ports, wherein a liquid flow pattern is established that carries the waste liquid in an upward direction through the loaded filter medium support membrane and out of the internal volume of the housing through at least one of the one or more liquid outlet ports; and further wherein a first portion of the waste particles is carried with the waste liquid into the loaded filter medium support membrane, where they are trapped by the particulate filter medium, which filters them out of the waste liquid and prevents them from flowing out of the one or more liquid outlet ports with the waste liquid, and a second portion of the waste particles, having a higher average particle mass than the first portion of waste particles, falls to the bottom of the housing, under gravity, without being carried into the loaded filter medium support;
discontinuing the introduction of the waste liquid into the internal volume of the housing;
opening the drain port;
introducing air into the internal volume of the housing through the air vent;
rinsing the filter medium support membrane with a rinsing liquid to release particulate filter medium from the filter medium support membrane;
draining the waste liquid remaining in the internal volume of the housing and the particulate filter medium containing the filtered waste particles through the drain port
moving the movable inlet extension tube into the second position; and
introducing the liquid suspension of particulate filter medium into the internal volume of the housing through the movable inlet extension tube.

7. A method of filtering a waste liquid comprising a suspension of waste particles using a filter apparatus comprising:
(a) a housing defining an internal volume;
(b) one or more liquid inlet ports defined by apertures in a wall of the housing;
(c) one or more liquid outlet ports defined by apertures in a wall of the housing, the one or more liquid outlet ports disposed above the one or more liquid inlet ports;
(d) a filter medium support membrane housed within the housing and disposed between at least one of the one or more liquid inlet ports and at least one of the one or more liquid outlet ports;
(e) a filter medium source comprising a liquid suspension of a particulate filter medium that traps and filters waste particles from the waste liquid;
(f) a filter medium charging tube comprising an inlet aperture in fluid communication with the filter medium source and an outlet aperture disposed within the housing below the filter medium support membrane;
(g) a drain port defined by an aperture in a wall of the housing and configured to release liquid from the internal volume of the housing; and
(h) an air vent in communication with the internal volume of the housing and configured to introduce air into the internal volume of the housing;
(i) a rinsing liquid source comprising a rinsing liquid suitable for rinsing particulate filter medium out of the filter medium support membrane; and
(j) a shower wand housed within the housing below the filter medium support membrane, the shower wand comprising a tube having a plurality of spray ports disposed along its length, wherein the shower wand is in fluid communication with the rinsing liquid source through one of the one or more liquid inlet ports and is rotatable around its longitudinal axis; and
wherein the filter medium charging tube comprises a movable inlet extension tube disposed within the housing and configured such that it can be moved from a first position, in which its internal bore is not aligned with a liquid inlet port, to a second position, in which its internal bore is aligned with a liquid inlet port, such that when the movable inlet extension tube is in the second position it is fluid communication with the with the filter medium source through said liquid inlet port and further wherein the movable inlet extension tube is attached to the shower wand, such that the movable inlet extension tube can be moved from the first position to the second position by rotating the shower wand around its longitudinal axis, the method comprising:

introducing a liquid suspension of particulate filter medium into the internal volume of the housing through one of the one or more liquid inlet ports, wherein the liquid suspension flows upward through the support membrane, such that the suspended particulate filter medium is loaded against the lower surface of the filter medium support membrane;

introducing the waste liquid into the internal volume of the housing through at least one of the one or more liquid inlet ports, wherein a liquid flow pattern is established that carries the waste liquid in an upward direction through the loaded filter medium support membrane and out of the internal volume of the housing through at least one of the one or more liquid outlet ports; and further wherein a first portion of the waste particles is carried with the waste liquid into the loaded filter medium support membrane, where they are trapped by the particulate filter medium, which filters them out of the waste liquid and prevents them from flowing out of the one or more liquid outlet ports with the waste liquid, and a second portion of the waste particles, having a higher average particle mass than the first portion of waste particles, falls to the bottom of the housing, under gravity, without being carried into the loaded filter medium support;

discontinuing the introduction of the waste liquid into the internal volume of the housing;

opening the drain port;

introducing air into the internal volume of the housing through the air vent;

introducing a rinsing liquid into the shower wand, whereby the rinsing liquid sprays out the plurality of spray ports, and rotating the shower wand around it longitudinal axis such that the rinsing liquid sprays the lower surface of the filter medium support membrane to release particulate filter medium from the filter medium support membrane;

discontinuing the introduction of the rinsing liquid into the shower wand;

draining the waste liquid remaining in the internal volume of the housing and the particulate filter medium containing the filtered waste particles through the drain port;

moving the movable inlet extension tube into the second position; and introducing the liquid suspension of particulate filter medium into the internal volume of the housing through the movable inlet extension tube.

8. The method of claim 7, further comprising:

discontinuing the introduction of the liquid suspension of particulate filter medium; and moving the inlet extension tube back into the first position.

9. A method of filtering a waste liquid comprising a suspension of waste particles using a filter apparatus comprising:

(a) a housing defining an internal volume;
(b) one or more liquid inlet ports defined by apertures in a wall of the housing;
(c) one or more liquid outlet ports defined by apertures in a wall of the housing, the one or more liquid outlet ports disposed above the one or more liquid inlet ports; and
(d) a filter medium support membrane housed within the housing and disposed between at least one of the one or more liquid inlet ports and at least one of the one or more liquid outlet ports;

the method comprising:

introducing a liquid suspension of particulate filter medium that traps and filters waste particles from the waste liquid into the internal volume of the housing through one of the one or more liquid inlet ports, wherein the liquid suspension flows upward through the support membrane, such that the suspended particulate filter medium is loaded against the lower surface of the filter medium support membrane;

introducing the waste liquid into the internal volume of the housing through at least one of the one or more liquid inlet ports, wherein a liquid flow pattern is established that carries the waste liquid in an upward direction through the loaded filter medium support membrane and out of the internal volume of the housing through at least one of the one or more liquid outlet ports; and further wherein a first portion of the waste particles is carried with the waste liquid into the loaded filter medium support membrane, where they are trapped by the particulate filter medium, which filters them out of the waste liquid and prevents them from flowing out of the one or more liquid outlet ports with the waste liquid, and a second portion of the waste particles, having a higher average particle mass than the first portion of waste particles, falls to the bottom of the housing, under gravity, without being carried into the loaded filter medium support membrane;

(iii) discontinuing the introduction of the waste liquid into the internal volume of the housing and replacing the flow of the waste liquid in the upward direction with a downward flow of air against the filter medium support membrane;

(iv) draining the waste liquid remaining in the housing;

(v) rinsing the filter medium support membrane with a rinsing liquid to release the particulate filter medium from the filter medium support membrane; and (vi) draining the released particulate filter medium, along with the first portion of waste particles that were filtered by the particulate filter medium, out of the housing;

wherein the method does not include the step of backwashing water through the particulate filter medium to clean filtered waste particles from the particulate filter medium.

10. The method of claim 9, wherein the waste liquid passes through only a single loaded filter medium support membrane within the housing.

11. The method of claim 9, wherein the filter medium support membrane comprises a plastic woven material.

12. The method of claim 9, wherein the particulate filter medium is diatomaceous earth.

13. The method of claim 9, wherein the waste particle filtering capacity of the particulate filter medium is equivalent to, or substantially equivalent to, that of diatomaceous earth.

* * * * *